March 12, 1957     H. P. BORIE, JR     2,784,884
MEASURING AND DISPENSING DEVICE Filed July 27, 1954     2 Sheets-Sheet 1

INVENTOR
Henry P. Borie Jr.
BY Rockwell & Bartholow
ATTORNEYS

March 12, 1957 H. P. BORIE, JR 2,784,884
MEASURING AND DISPENSING DEVICE
Filed July 27, 1954 2 Sheets-Sheet 2
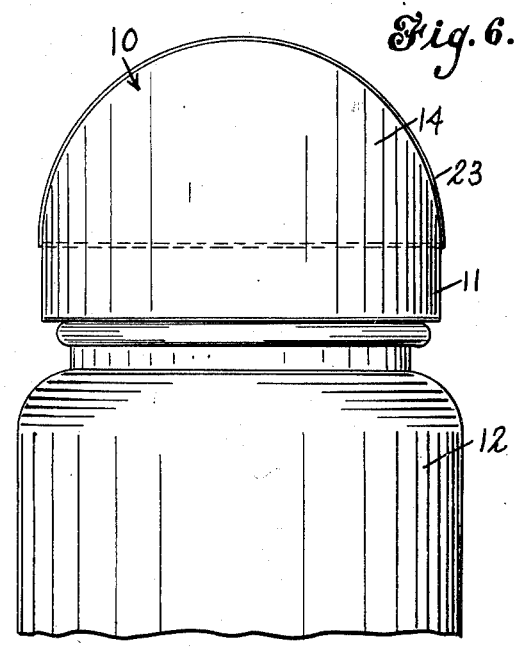
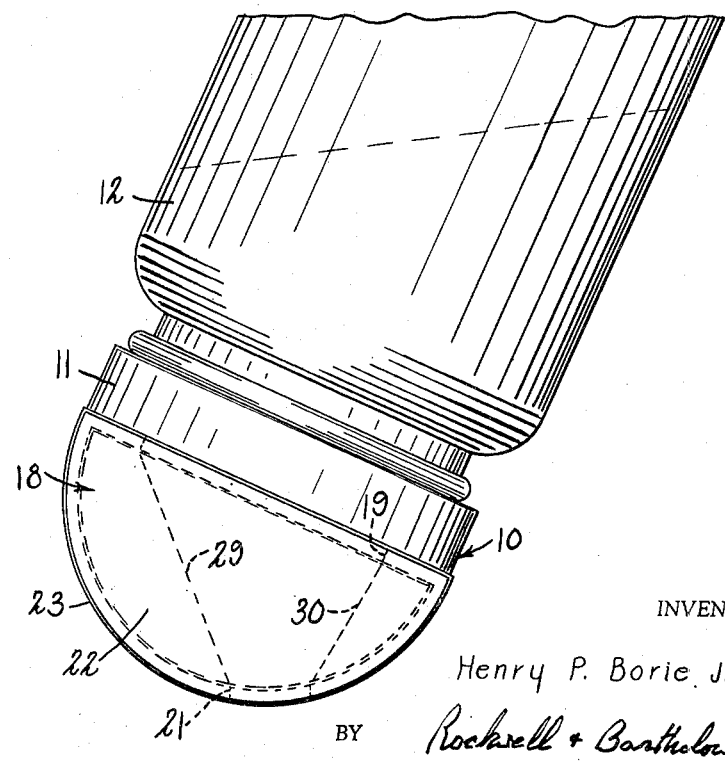
INVENTOR
Henry P. Borie, Jr.
BY Rockwell + Bartholow
ATTORNEYS United States Patent Office 2,784,884
Patented Mar. 12, 1957

2,784,884

MEASURING AND DISPENSING DEVICE

Henry P. Borie, Jr., Milford, Conn.

Application July 27, 1954, Serial No. 446,055

5 Claims. (Cl. 222—336)

This invention relates to measuring and dispensing devices, and, while not limited thereto, is particularly useful for measuring and dispensing instant coffee. The invention relates more particularly to a measuring and dispensing device having a threaded flange for connection to the threaded rim of a jar or receptacle for material to be dispensed.

One object of the invention is to provide an improved measuring and dispensing device particularly well suited to dispense instant coffee.

Another object of the invention is to provide a device, such as described above, and having effective means for inhibiting the entrance of moisture into the attached receptacle for material to be dispensed.

Another object of the invention is to provide a device, such as characterized above, which facilitates the flow of material from the attached receptacle and which may be readily disassembled for cleaning.

Still another object of the invention is to provide a measuring and dispensing device constituted by few and rugged parts, and which may be produced at low cost.

In the drawings:

Fig. 6 is an enlarged front view of the device; and

Fig. 7 is an enlarged rear view of the device attached to the receptacle and shown in the preferred loading and discharging position.

Figure 1:
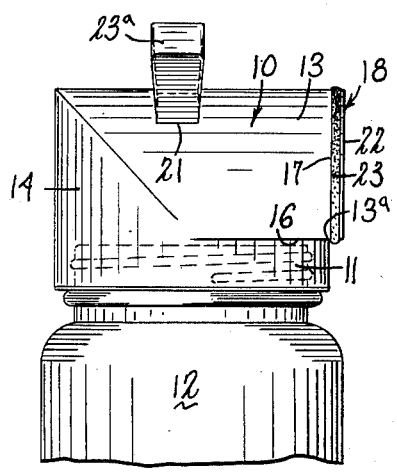
Fig. 1 is an elevational view of a measuring and dispensing device embodying the invention, the view illustrating a portion of a receptacle having a threaded connection to the device, and the device being illustrated in sealed condition.
Figure 2:
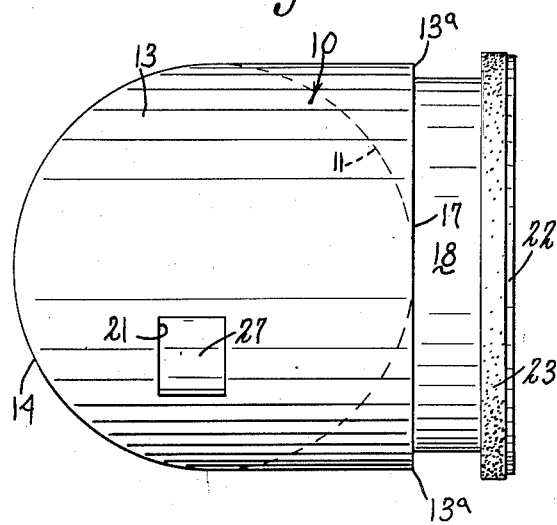
Fig. 2 is an enlarged top plan view of the device in unsealed condition, the plunger or slide thereof being shown in loading condition.
Figure 3:
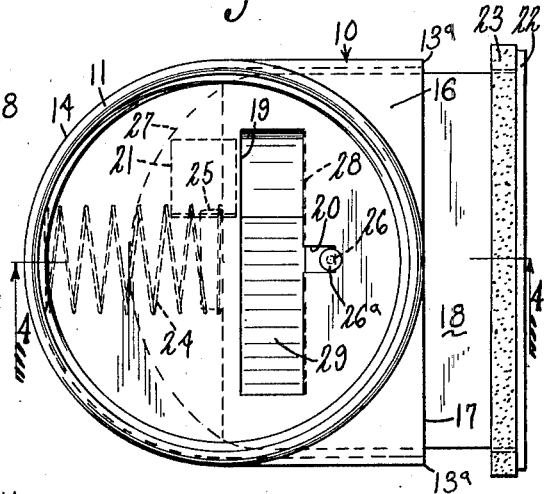
Fig. 3 is an enlarged bottom view of the dispenser in the condition shown in Fig. 2.

In the drawings, the shell of the measuring and dispensing device is indicated generally at 10, the shell 10 having a lower flange portion 11 threaded internally and receiving the threaded (Fig. 1) rim portion of a jar 12 containing material to be dispensed, such as instant coffee, for example. As shown in Figs. 1 and 2, the shell 10 at the upper portion thereof is rounded as at 13, and the forward portion of the shell is rounded as at 14, providing an elbow-like structure. The flange portion 11 of the shell is round and has a part thereof coincident with said rounded forward portion of the shell. As shown in Figs. 2 and 3, the shell 10, in plan, is squared off at the rear thereof and has projecting corners 13a overhanging the flange portion 11 in the position of the shell illustrated in Fig. 1. Also, as shown in Figs. 2 and 3, the flange portion 11 is coincident at one point with the squared off rear of the shell. The shell 10, which is preferably formed of plastic material, is provided with an integral horizontally extending partition 16 disposed directly above the flange portion 11 in the position of the shell illustrated in Fig. 1. The partition 16 extends between the corners 13a and extends from the rear of the shell to the front thereof, the partition 16 forming with the rounded portions 13 and 14 of the shell a horizontally extending valve housing of substantially hemispherical shape in cross section through the greater part of the length thereof. The valve housing receives a valve in the form of a plunger or slide 18 which will be described hereinafter.

As best shown in Fig. 3, the partition 16 of the shell is provided with an oblong opening 19 offset rearwardly from the axis of the round flange portion 11 of the shell and extending transversely of the shell. Also, as shown in this view, the rearmost edge of the opening 19 is recessed, as at 20, approximately midway between the ends of the oblong opening 19 and approximately on a line which may be referred to as the center line of the shell front to rear. The shell 10 is provided with a discharge port 21 of rectangular formation in the upper portion of the shell 10 and at one side of said center line of the shell. The relationship of the discharge opening 21 to the oblong opening or inlet 19 is shown in Fig. 3.

Figure 4:
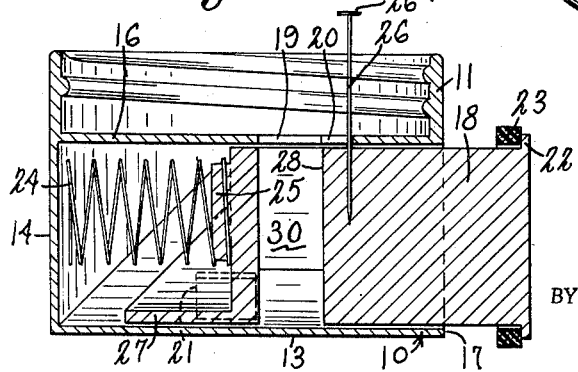
Fig. 4 is a sectional view on line 4—4 of Fig. 3, the plunger or slide of the device being illustrated in loading position.

The plunger or slide 18, which may be formed of plastic material, is of substantially hemispherical shape in cross section throughout the greater part of the length thereof and extends into the rear of the valve housing, the dimensions of the slide 18 in cross section being only slightly less than the internal dimensions of the valve housing. The slide 18 is enlarged at the rear end thereof, as at 22, and a gasket 23 is provided forwardly and closely adjacent the enlargement 22. The gasket 23 encircles the slide 18 and is suitably secured thereto. The slide 18 is provided with a helical spring 24 urging the slide to the rearward or outer position thereof illustrated in Fig. 4, for example. One end of the spring 24 embraces a lug 25 provided on the forward end portion of the slide, and the other end of the spring 24 engages the forward wall of the shell 10. A substantially vertically extending pin 26 extends into the slide 18 as shown in Fig. 4, and is movable into the recess 20 formed in the partition 16 of the shell, to limit rearward movement of the slide 18. The spring 24 is disposed on substantially the longitudinal median line of the slide 18 and is constantly under compression. Owing to the aforementioned disposition of the spring 24 relatively to the slide 18 and the hemispherical cross section of the slide 18, cocking of the slide is inhibited. The slide 18 is provided at the forward end thereof with an extension or lip 27, and in the rearward position of the slide 18 the forward end structure of the slide closes the discharge port 21 in the shell, as shown in Fig. 4.

Figure 5:
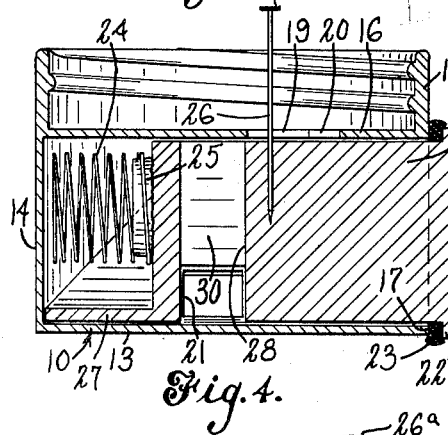
Fig. 5 is a sectional view similar to Fig. 4 and illustrating the slide of the device in discharging position.

Forwardly of the pin 26, the slide 18 is provided with an opening 28 extending through the top and the bottom thereof and elongated transversely of the slide, as shown in Fig. 3. As shown in this view, the end walls of the opening 28 converge in a direction away from the partition 16. One end wall 29 of the opening 28 is gradually inclined and the other end wall 30 is sharply vertically inclined. From the foregoing, it will be understood that, when the slide 18 is in the rearward position illustrated in Fig. 4, and the jar 12 containing material to be dispensed is inverted, the material flows into the opening 28 in the slide through the opening 19 formed in the shell, the openings 19, 28 registering with one another in the last-mentioned position of the slide. The preferred loading and discharging position of the device is shown in Fig. 7. In this view, the device is inclined at an angle of approximately 45° so that the flow of material from the receptacle 12 is facilitated. It will be understood that the inclination of the end walls 29, 30 of the opening 28 facilitates filling the opening 28 with material from the receptacle when the device is in the last-mentioned position. It will be further understood that when the slide 18 is in the rearward position thereof, the opening 28 is not in communication with the discharge port 21 in the shell, but forms with the substantially hemispherical portion 13 of the shell a chamber which may be so dimensioned that the chamber may receive only sufficient instant coffee to make one cup of coffee, for example. When the slide 18 is moved to the forward position thereof, as by sufficient finger pressure on the rear end of the slide to overcome the compressive force of the spring 24, the opening 28 in the slide registers with the discharge port 21 in the shell, and the measured quantity of material is dumped from the measuring and dispensing device. If desired, the slide 18 may be manipulated in such a manner that the latter assumes and is held in a position intermediate the forward and the rearward positions thereof. In the last-mentioned position of the slide 18, material in the jar 12 may flow uninterruptedly through the measuring and dispensing device. As shown in Fig. 5, the opening 28 in the slide is not in communication with the jar 12 when the slide is in the inner or forward position thereof, but is cut off therefrom by the partition 16 of the shell.

One important advantage of the measuring and dispensing device disclosed herein is attributable to the provision of the substantially semicircular portion 13 of the shell having the discharge port 21 laterally offset from the median line thereof front to rear, in combination with the slide 18 of substantially semicircular cross section throughout the greater part of the length thereof, and having in the last-mentioned part the upward opening 28 therein elongated transversely of the slide, the end wall 29 of the opening being gradually inclined to said side of the median line front to rear of the shell. This feature greatly facilitates the flow of material from the jar 12 into the measuring and dispensing device and inhibits the formation of pockets in the material to be dispensed. Furthermore, clogging of the material in the device is inhibited owing to this feature. As mentioned above, the semicircular cross section of the slide 18 inhibits cocking of the slide. The aforementioned pin 26, extending from the slide 18 into the mouth portion of the jar 12, is provided with an enlargement 26ª and serves as an agitator. The pin 26 also serves to break up lumps of material in the jar 12. The pin 26 maintains the shell and the slide in assembled relationship and may be readily removed from the slide so that the latter may be removed from the shell for cleaning purposes. Another advantage of the device illustrated and described herein is due to the provision of effective means for inhibiting the entrance of moisture into the jar 12. In this connection, it may be noted that the aforementioned gasket 23 fixed to the slide is engageable with the rim portion 17 of the valve housing to limit forward movement of the slide, as shown in Fig. 5. Thus the gasket 23 seals the rear of the shell 10 when the slide 18 is in the forward position thereof, and when the slide is in this position, a plug 23ª may be inserted in the discharge port 21 to seal the same, the plug 23ª extending into the opening 28 in the slide to maintain the slide in the forward position thereof. The measuring and dispensing device of the invention is constituted by few and rugged parts and will not easily get out of order. The device has proven very satisfactory in use and may be produced at low cost.

While the presently preferred form of the invention has been described and illustrated in the drawings, it will be understood that the invention may take other forms without departure from the principles of the invention and the scope of the claims.

What I claim is:

1. In a measuring and dispensing device of the character described and for use with a receptacle having a threaded mouth portion, a shell having a flange portion threaded internally for connection to the mouth portion of the receptacle and having a partition extending over the mouth of the receptacle, said partition being provided with an inlet for material to be dispensed from the receptacle, said shell having a hollow outer portion forming with said partition an elongated valve housing extending at substantially right angles to the axis of said flange portion and of substantially hemispherical shape in cross section throughout the greater part of the length thereof, said outer portion of the shell having a discharge port formed therein at one side of the longitudinal center line of the housing, and a manually operable slide constituting a valve extensible into the valve housing and spring biased to the normal position thereof in which said discharge port is closed by the slide, said slide being provided with a wall structure defining an upward opening elongated transversely of the slide, the end walls of said wall structure converging outwardly, the end wall at said side of the center line being sharply inclined and the other end wall thereof being gradually inclined whereby the flow of material from the receptacle into said opening is facilitated when said opening registers with said inlet, said opening registering with said inlet in the normal position of the slide and said slide being movable to a position in which said opening registers with said discharge port, said partition covering said opening in the last-mentioned position of the slide.

2. In a dispensing device of the character described and for use with a receptacle having a threaded mouth portion, a shell having two arm portions forming an elbow, one arm portion having a threaded cylindrical part for connection to the mouth portion of the receptacle, the other of said arm portions having a wall structure substantially hemispherical in cross section throughout the greater part of the length thereof and having an open end, the last-mentioned arm portion having a discharge port formed in the hemispherical wall structure, and a spring-biased valve in the form of a slide substantially hemispherical in cross section throughout the greater part of the length thereof, the slide extending through the open end of the last-mentioned arm portion, said slide being spring biased to a position in which the slide extends outwardly through said open end and in which said discharge port is closed by the slide, and the slide having an opening formed therein intermediate the ends thereof registering with said discharge port when the slide is moved manually inwardly.

3. In a dispensing device of the character described and for use with a receptacle having a threaded mouth portion, a shell having two arm portions forming an elbow, one arm portion having a threaded cylindrical part for connection to the mouth portion of the receptacle, the other of said arm portions having a wall structure substantially hemispherical in cross section throughout the greater part of the length thereof and having an open end, the last-mentioned arm portion having a discharge port formed in the hemispherical wall structure, and a spring-biased valve in the form of a slide substantially hemispherical in cross section throughout the greater part of the length thereof, the slide extending through the open end of the last-mentioned arm portion, said slide being spring biased to a position in which the slide extends outwardly through said open end and in which said discharge port is closed by the slide, and the slide having an opening formed therein intermediate the ends thereof registering with said discharge port when the slide is moved manually inwardly, said shell having a partition element intermediate the slide and said cylindrical part closing the opening in the slide when the latter is in the inward position thereof.

4. In a material dispenser of the class described and for use with a receptacle having a threaded mouth portion, a two-part receptacle closure member, said member comprising a threaded part for connection to the mouth portion of the receptacle and comprising a part providing a valve housing over the mouth portion of the receptacle having a discharge port formed therein, a manually operable valve in the form of a slide extensible into the valve housing and having an opening formed intermediate the ends thereof, said slide being spring biased to an outer position in which said discharge port is closed by said slide, and said slide being movable by manipulation to an inner position in which said opening registers with said discharge port, a gasket to form a moistureproof seal embracing said slide in fixed relation thereto and engageable with the housing when the slide is in the last-mentioned position thereof, and a removable plug member to form a moistureproof seal extending through said discharge port and into said opening of the slide in the last-mentioned position thereof whereby the slide may be held in the inner position thereof and whereby the penetration of moisture into the receptacle is inhibited.

5. A measuring dispenser for granular and powdered materials of hygroscopic nature, comprising means for making a tight seal with a container for said materials; a shell portion, an elongated plunger or slide in said shell portion having a flange on one end thereof and adapted to be wholly contained within the shell, a discharge opening in said shell, a partition between said sealing means and the plunger or slide, said plunger being spring biased outwardly therefrom; an opening in said plunger adapted to register with an opening in the partition in the outward position, and an opening in the shell adapted to register with a second opening in the plunger in the closed position; a gasket on said plunger flange adapted to contact the shell, plug means connected with said shell opening and the opening in the plunger to hold the plunger, flange and gasket against the shell to make a tight seal therein while sealing the plunger and shell opening at the same time.

References Cited in the file of this patent

UNITED STATES PATENTS

| | | |
|---|---|---|
| 1,679,604 | Cooke | Aug. 7, 1928 |
| 1,904,756 | Wooster | Apr. 18, 1933 |
| 2,603,386 | Barnes | July 15, 1952 |